W. LÜMATAINEN.
TIRE CHAIN CONNECTING DEVICE.
APPLICATION FILED APR. 26, 1921.
1,389,590.
Patented Sept. 6, 1921.
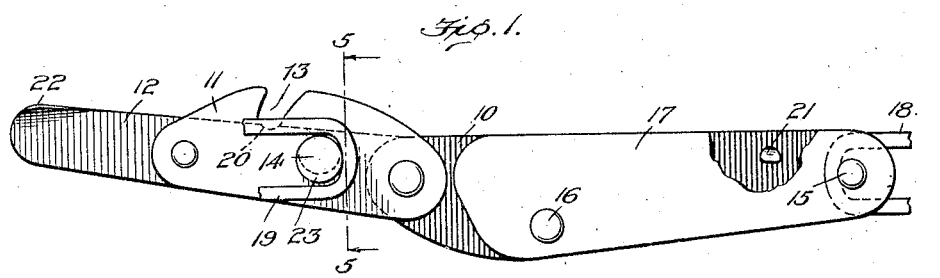
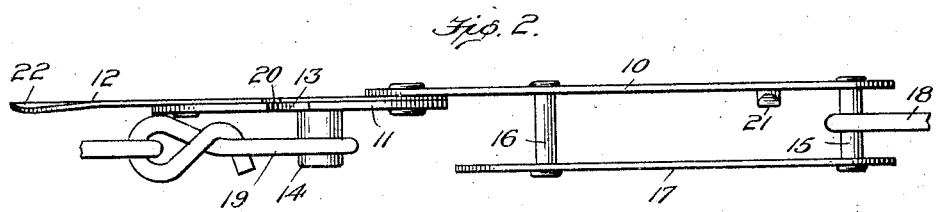
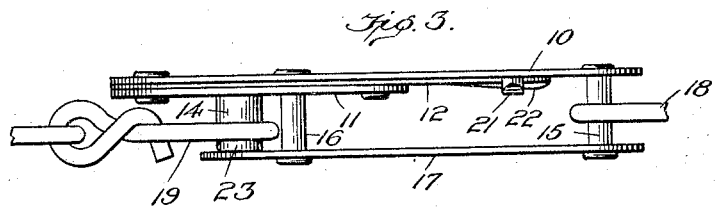
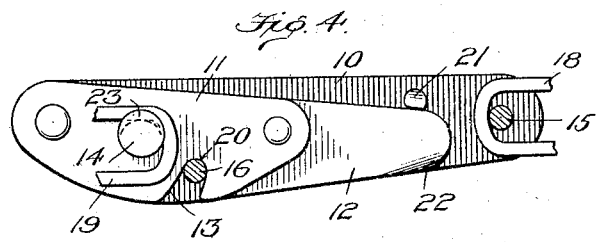
Witness
Edwin L. Bradford
Inventor
William Lümatainen
By
his Attorneys

UNITED STATES PATENT OFFICE.

WILLIAM LÜMATAINEN, OF ALBION, PENNSYLVANIA.

TIRE-CHAIN-CONNECTING DEVICE.

1,389,590.  Specification of Letters Patent.  Patented Sept. 6, 1921.

Application filed April 26, 1921. Serial No. 464,491.

*To all whom it may concern:*

Be it known that I, WILLIAM LÜMATAINEN, a citizen of the United States, residing at Albion, in the county of Erie and State of Pennsylvania, have invented certain new and useful Improvements in Tire-Chain-Connecting Devices; and I do hereby declare the following to be a full, clear, and exact description of the same, reference being had to the accompanying drawings, forming part of this specification.

This invention relates to connecting devices and especially to the lever type of connecting devices for securing the ends of the tire chains used on automobile tires.

An object of the present invention is to provide a connecting device of a construction that is both simple and low in cost of manufacture but that is, nevertheless, efficient in operation.

A further object is to provide a connecting device of the lever type that can easily be opened and closed and, when closed, will securely connect the ends of the tire chain.

In its subordinate features the invention consists in certain details and combinations of parts, all of which will be first described, and then pointed out in the appended claims.

In the accompanying drawings,—

Figure 1 is an elevation of the connecting device with the keeper in its opened position, a portion of the guard being broken away.

Fig. 2 is a top plan view of the device shown in Fig. 1.

Fig. 3 is a similar view showing the keeper closed.

Fig. 4 is an elevation with the keeper in its closed position and the guard plate removed; and Fig. 5 is a detail view of the chain link post taken on the line 5—5 in Fig. 1.

The connecting device may be made of rather stiff sheet metal or other suitable metal about three sixteenths of an inch thick, more or less. As shown in the drawings the device comprises an elongated, flat connector plate 10 to which is pivoted a keeper 11, composed of a relatively long strip 12 of resilient sheet metal and another shorter strip of heavier metal having a recess 13 therein and a laterally projecting post 14 mounted thereon. Preferably the keeper 11 is composed of two pieces as described with post 14 formed integral therewith, although said keeper may, if desired, be formed of a single piece of material it only being necessary that the free end portion of the keeper be resilient for a purpose that will presently appear.

Spaced from connector plate 10 and mounted on laterally projecting cross bars or pins 15, 16 secured to said connector plate adjacent the opposite ends of the latter, is a guard plate 17, the connector plate and guard plate practically forming the sides of the device. Preferably the guard plate 17 is also made of rather heavy sheet metal similar to plate 10.

Keeper 11, when closed is adapted to lie between the connector plate 10 and guard plate 17 as shown in Figs. 3 and 4, but is adapted to be opened to the position shown in Figs. 1 and 2 for securing a link of the free end of the side chain on the lateral post 14.

A link 18 at one end of the side chain is permanently attached to the cross bar or pin 15 at the end of connector plate 10 opposite that to which the keeper is pivoted and in applying the chain to the tire the keeper is thrown to its open position and one of the links 19 of the free end of the chain is placed around the post 14. Keeper 11 is then turned on its pivot to its closed position, *i. e.*, between the connector and guard plates until the end wall 20 of recess 13 comes in contact with the cross pin 16, said cross pin 16 being so positioned with respect to the pivotal point of the keeper that the latter can be turned on its pivot pin until it has passed below its pivotal center. This practically prevents the keeper being pulled back to open position by the chain which has, of course, been placed under some tension by the closing of the keeper and the cross pin 16 limits the closing movement of the keeper, but to insure against the keeper 11 being pulled back it is adapted to be locked in its closed position by a locking stud 21 preferably formed on the inner side of connector plate 10.

The face of stud 21 is beveled, the edge of the stud nearest the keeper as the latter is closed lying almost flush with the surface of the connector plate and its opposite edge projects a considerable distance from the surface of said plate. As keeper 11 is held closely against the connector plate 10 by its pivot pin, one side of the free end of said keeper is offset or twisted, as at 22, to permit the end of the keeper as it approaches stud 21 to engage the beveled end face, and not the side face, of said stud. The end portion of the keeper, as before mentioned being resilient will readily ride over the stud and immediately after it passes beyond the edge of the stud it will snap down behind said stud and be securely held against being opened by the tensioned side chain. When it is desired to open the keeper it is only necessary to insert any instrument such as a screw driver, or even a pencil or small stick, between the connector plate and resilient end of the keeper and raise said end a sufficient distance to permit it to pass stud 21.

To avoid any possibility of the link 19 of the free end of the chain coming off post 14 during the closing movement of keeper 11, the outer end of the post is headed up to form a small flange 23 extending about half way around said post, as shown in Figs. 1 and 5.

Post 14 projects from keeper 11 a distance equal to that between connector plate 10 and guard plate 17, the outer end face of the post making a close fit with the guard plate and when the keeper is moved to its closed position said guard plate 17 will absolutely insure the link 19 being retained on the post.

What I claim is:

1. In a tire chain connecting device, the combination of a connector, a guard carried by the connector, a keeper pivotally mounted on the connector, and a laterally projecting post for a link of the free end of the chain carried by the keeper and adapted to be moved between the connector and guard whereby lateral displacement of the chain link from the post is prevented.

2. In a tire chain connecting device, the combination of a connector, a guard carried by the connector, a keeper pivotally mounted on the connector and a laterally projecting post for a link of the free end of the chain carried by the keeper and adapted to be moved between the connector and guard to a position beyond the pivotal center of the keeper when closed, and means for limiting the closing movement of the keeper.

3. In a tire chain connecting device, the combination of a connector, a guard carried by the connector, a keeper pivotally mounted on the connector and a laterally projecting post for a link of the free end of the chain carried by the keeper and adapted to be moved between the connector and guard to a position beyond the pivotal center of the keeper when closed, means for limiting the closing movement of the keeper, and means for releasably locking the keeper in closed position.

4. In a tire chain connecting device, the combination of a connector plate, a guard plate spaced laterally from the connector plate, rigid cross pieces connecting said plate, and one of said cross pieces being adapted to have one end of the chain secured thereto, and a keeper pivoted to the connector plate adapted to be moved between the plates when closed, the closing movement of the keeper being limited by the other rigid cross piece.

5. In a tire chain connecting device, the combination of a connector plate, a guard carried by the connector plate, a keeper pivoted on the connector plate and movable between said plate and guard, a post carried by the keeper, and means for locking the keeper and post between the connector plate and guard.

6. In a tire chain connecting device, the combination of a connector plate, a guard plate carried by the connector plate, a laterally projecting stud carried on one of said plates, a keeper pivoted adjacent one of its ends to one of said plates and movable between said plates, the opposite end of said keeper being flexible and adapted to ride over said stud whereby the keeper will be locked between the plates, and a post for a link of the free end of the chain carried by the keeper.

7. In a tire chain connecting device, the combination of a connector, a guard spaced from the connector, a pivotally mounted keeper adapted to be moved between the connector and guard, a post for a link of the free end of the chain carried by the keeper, and means for locking the keeper between the connector and plate.

8. In a tire chain connecting device, the combination of a connector, a guard spaced from the connector, a pivotally mounted keeper adapted to be moved between the connector and guard, a post for a link of the free end of the chain carried by the keeper, said post having an offset end portion to prevent displacement of the link during closing movement, and means for locking the keeper between the connector and plate.

WILLIAM LÜMATAINEN.